United States Patent
Tushar et al.

(10) Patent No.: US 6,431,987 B1
(45) Date of Patent: Aug. 13, 2002

(54) SPHERICAL SWIVEL WITH ELASTOMERIC POSITIONING DEVICE

(75) Inventors: Thomas A. Tushar, Bloomington; Paul J. Leska, Sr., Coon Rapids, both of MN (US)

(73) Assignee: MTS Systems Corporation, Eden Prairie, MN (US)

(*) Notice: Subject to any disclaimer, the term of this patent is extended or adjusted under 35 U.S.C. 154(b) by 0 days.

(21) Appl. No.: 09/721,361

(22) Filed: Nov. 22, 2000

Related U.S. Application Data
(60) Provisional application No. 60/167,143, filed on Nov. 23, 1999.

(51) Int. Cl.[7] .................................................. A47F 5/12
(52) U.S. Cl. ............................ 464/112; 108/9; 403/114
(58) Field of Search .............................. 403/57, 79, 114, 403/122, 131, 132, 157; 464/112, 147, 150; 108/9, 20, 137; 248/181.1, 372.1; 74/593

(56) References Cited

U.S. PATENT DOCUMENTS

| | | | | |
|---|---|---|---|---|
| 526,013 A | | 9/1894 | Howard | |
| 1,734,244 A | * | 11/1929 | Bingman | 403/114 X |
| 3,377,088 A | * | 4/1968 | Millay et al. | 403/57 |
| 3,923,349 A | * | 12/1975 | Herbst | 403/79 X |
| 4,139,245 A | | 2/1979 | McCloskey | |
| 4,808,023 A | * | 2/1989 | Arnold et al. | 403/157 |
| 5,519,913 A | | 5/1996 | Schedule | |
| 5,752,834 A | | 5/1998 | Ling | |
| 5,931,597 A | * | 8/1999 | Urbach | 403/122 X |
| 6,074,126 A | * | 6/2000 | Hunter et al. | 403/157 X |

FOREIGN PATENT DOCUMENTS

| | | | | |
|---|---|---|---|---|
| DE | 662493 | * | 7/1938 | 403/157 |
| FR | 889575 | * | 1/1944 | 464/112 |
| GB | 17986 | * | of 1903 | 403/114 |

* cited by examiner

*Primary Examiner*—Greg Binda
(74) *Attorney, Agent, or Firm*—Westman, Champlin & Kelly, P.A.; S. Koehler

(57) ABSTRACT

A spherical swivel includes a base assembly having a clevis and a ball joined to the clevis. A swivel eye is movably joined to the ball. An elastomeric band positioning device includes an elastomeric band that is secured at opposite ends to the base assembly and is further secured to the swivel eye.

16 Claims, 4 Drawing Sheets

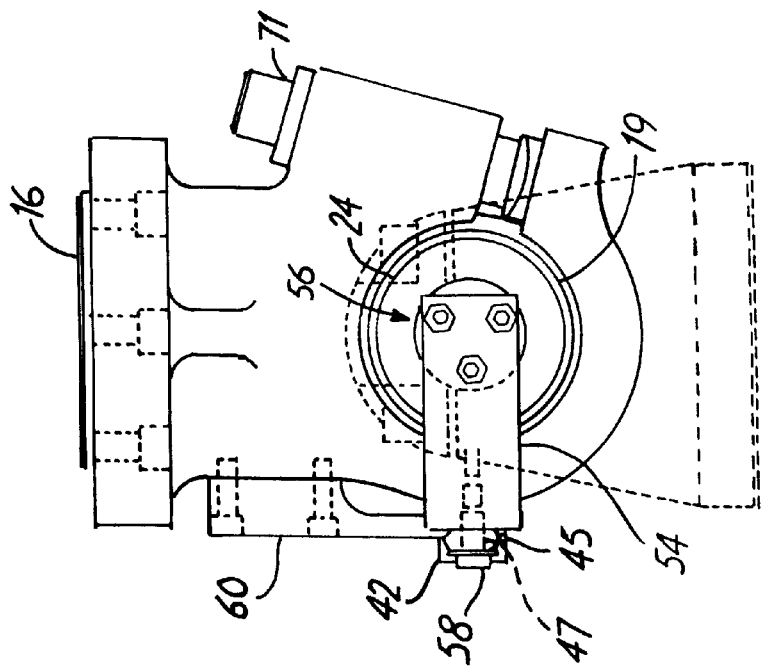
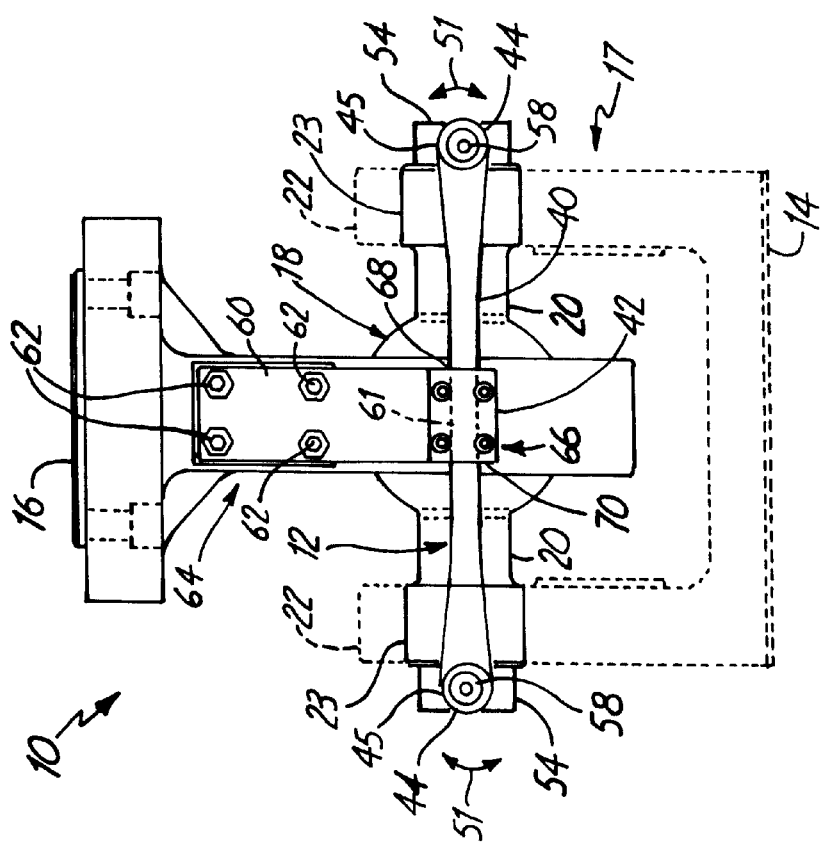

SPHERICAL SWIVEL WITH ELASTOMERIC POSITIONING DEVICE

CROSS REFERENCE TO RELATED APPLICATION

This application is based on and claims benefit of U.S. Provisional Patent Application Ser. No. 60/167,143, filed Nov. 23, 1999, the content of which is hereby incorporated by reference in its entirety.

BACKGROUND OF THE INVENTION

The present invention relates to spherical swivels or joints. More particularly, the present invention relates to a positioning device for positioning elements of the spherical swivel in a predetermined position.

Spherical swivels are well known devices that couple members together, yet allow motion in up to three degrees-of-freedom. Commonly, the spherical swivel includes a yoke or clevis coupled to one of the members and a swivel eye coupled to the other member. The yoke supports a ball on extending shaft portions thereof. A bearing element is provided in the swivel eye and contacts the outer surface of the ball, allowing relative motion in three degrees-of-freedom between the swivel eye and the ball.

The spherical swivel also can be used to transfer or impart significant loads between the coupled members. In some instances, however, the spherical swivel can assume a position which does not properly transfer loads between the connecting elements of the spherical swivel, which can, in turn, contribute to wear or failure of the spherical swivel.

SUMMARY OF THE INVENTION

A spherical swivel includes a base assembly having a clevis and a ball joined to the clevis. A swivel eye is movably joined to the ball. An elastomeric positioning device includes an elastomeric band that is secured at opposite ends to the base assembly and is further secured to the swivel eye.

Another aspect of the present invention is a multi-degree of freedom simulation system having a specimen support and a plurality of actuators. At least one swivel as described above operably couples at least one actuator to the specimen support.

BRIEF DESCRIPTION OF THE DRAWINGS

FIG. 1 is a front elevational view of a swivel of the present invention.

FIG. 2 is a side elevational view of the swivel.

DETAILED DESCRIPTION OF THE ILLUSTRATIVE EMBODIMENTS

Figure 3:
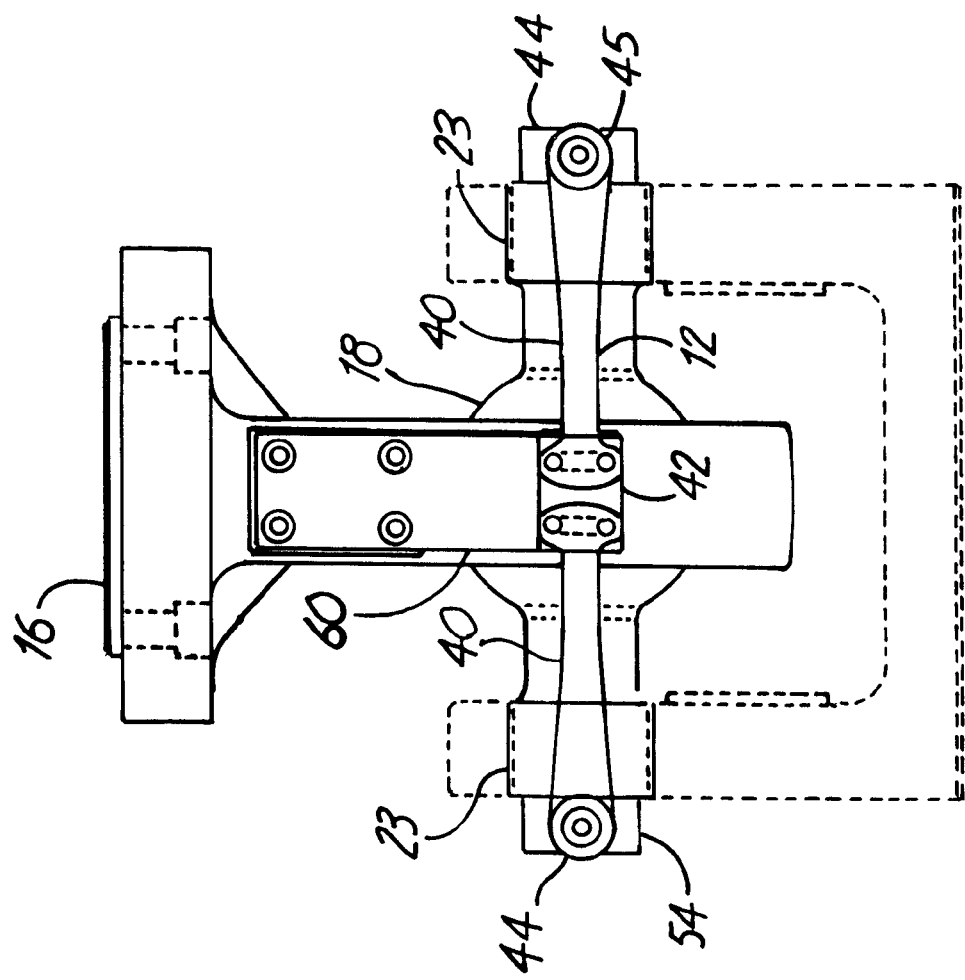
FIG. 3 is a front elevational view of a second embodiment of a swivel of the present invention.

FIGS. 1 and 2 illustrate a spherical swivel 10 having a first embodiment of an elastomeric positioning device 12 of the present invention. Generally, the spherical swivel 10 includes a yoke or clevis 14 (shown in dashed lines), a swivel eye 16 and a ball 18. The ball 18 includes extending shaft portions 20 (integral or separate elements fastened together) that can be joined to the clevis 14 with threads 23. In the embodiment illustrated, threaded cap members 22 hold the extending shaft portions 20 and thus the ball 18 in a fixed position on the clevis 14. As used herein, the clevis 14 and the ball 18 are considered a base assembly 17. The swivel eye 16 includes a bearing element 24 that contacts the outer surface of the ball 18 allowing relative movement between the swivel eye 16 and the ball 18. In one embodiment, the bearing can comprise a steel-backed PTFE bearing, while the ball 18 is covered with electrolysis nickel-boride to provide a low-friction coupling. Snap rings 19, or other suitable fasteners, retain the bearing element 24 in position in the swivel eye 16. It should be noted that the spherical swivel 10 herein illustrated is available from MTS Systems Corporation of Eden Prairie, Minn. (Ref No. 100-029-597), but is only one exemplary embodiment in that other spherical swivels can also benefit from the elastomeric positioning device 12 described below.

Generally, the elastomeric positioning device or assembly 12 includes an elastomeric band 40, a first holding device 42 secured to the swivel eye 16 and second holding devices 44 secured to the base assembly 17. The elastomeric band 40 can be made of a solid material, such as rubber, neoprene, etc., and can be made as one strand or a plurality of strands of the same material or a combination of materials. However, the elastomeric band 40 is readily deformable and does not include a rigid core, such as found in a spring. The elastomeric band 40 can thus contact and bend around components of the spherical swivel 10, such as portions of the clevis 14, with pivotal motion of the swivel eye 16 relative to the ball 18, and without permanent deformation, such as what might happen when a spring binds and kinks.

Figure 6:
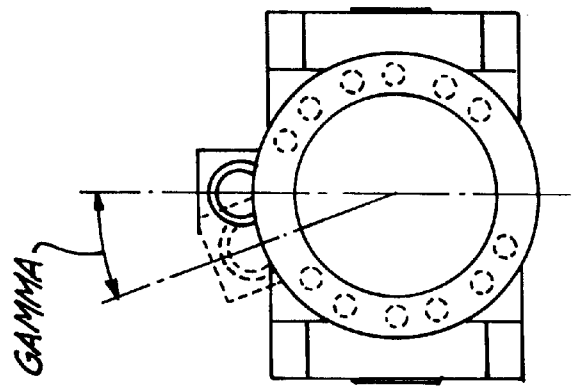
FIGS. 4, 5 and 6 illustrate motions of a swivel.
Figure 5:
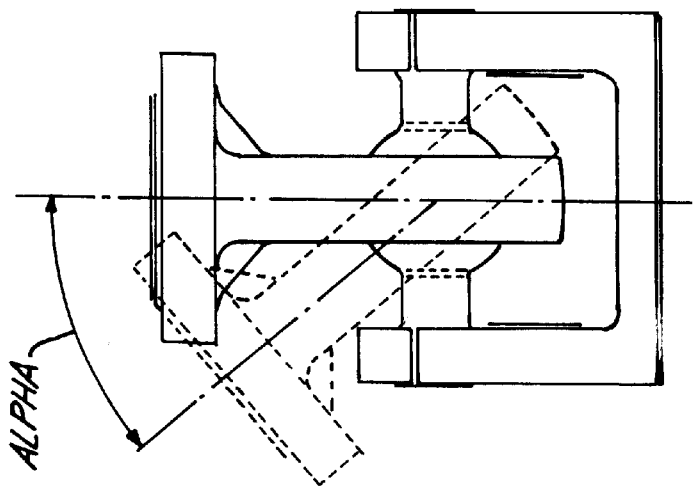
Figure 4:
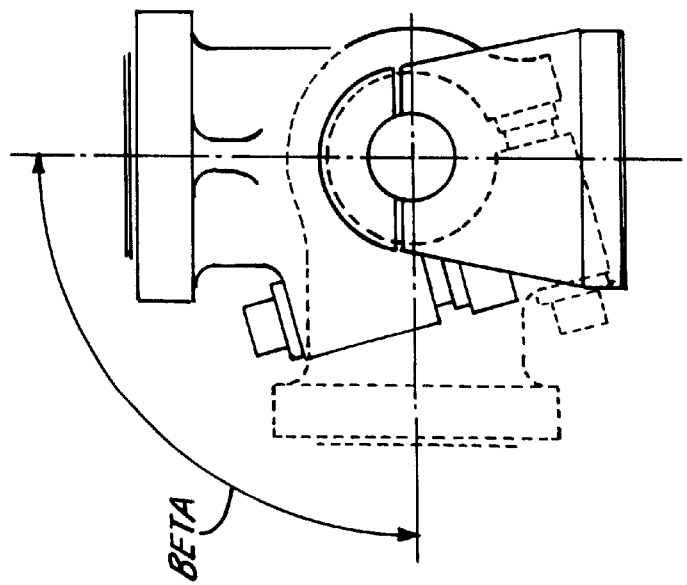

Inherent in the swivel design is a mass center of gravity imbalance in the swivel eye 16. This is due to the geometry of the part in its feature of adjustments to eliminate hysteresis or unwanted motions between the bearing element 24 and the swivel eye 16 via an adjusting bolt assembly 71. FIGS. 4–6 illustrate the 3 DOFs (degrees-of-freedom), namely Alpha, Beta and Gamma. Upon placing the prior art swivel assembly in a commanded position which excites an Alpha/Gamma function, the axial force resolved through the ball 18, is being transmitted through the bearing snap retention ring 19, which dislodges said ring causing swivel assembly failure. The elastomeric positioning device 12 allows full freedom of motion about the ball 18, but at the same time due to the elasticity and pre-load of the elastomeric band 40 provides a dynamic restoring energy to the swivel eye 16 correcting the off-centered mass center of gravity of the swivel eye 16 and restoring the gamma angle to about zero (the selected position in this embodiment) with reference to the shaft portions 20. In other words, the elastomeric positioning device 12 can dynamically rotate the swivel eye 16 about an axis perpendicular to the axis of the shaft portions for rotation of the swivel eye 16 about at least one of the other two axes. The energy for restoring comes in part from stretching the elastomeric band 40 as the swivel eye 16 rotates, and, in a preferred embodiment, from also the stored energy in the band 40 due to the preload contained therein when the swivel eye 16 is in the selected position.

The second holding devices 44 hold each respective end 45 of the elastomeric band 40 to the base assembly 17. In a preferred embodiment, each of the ends 45 of the elastomeric band 40 can pivot with respect to the base assembly 17 during pivotal motion of the swivel eye 16 relative to the base assembly 17. Double arrow 51 indicates the pivotal motion of the ends 45. In the embodiment illustrated, the ends 45 of the elastomeric band 40 are fastened to the extending shaft portions 20 of the ball 18 although the ends 45 can be secured to other portions of the base assembly 17. Brackets 54 extend from each respective shaft portion 20 and are fastened to an end of the shaft portion 20 with suitable fasteners, such as bolts 56. The ends 45 of the elastomeric band 40 each include an aperture 47 for receiving a standoff 58, for example, a bolt. Standoffs 58 have enlarged heads or ends to retain the ends 45 on the bracket 54. In one embodiment, as illustrated, it is preferable to center (radially orient) the elastomeric band 40 with respect to a central axis of the ball 18 and shaft portions 20 so that the swivel eye 16 obtains the desired position.

In the embodiment illustrated, the first holding device 42 comprises a clamping plate 60 that holds a center portion 61 of the elastomeric band 40 in position against an outer surface of the swivel eye 16. The elastomeric band 40 is preferably preloaded between the first holding device 42 and each of the second holding devices 44. A first plurality of fasteners 62 secure the clamping plate 60 to the swivel eye 16 on an extending portion 64 thereof. A second plurality of fasteners 66 further clamp the elastomeric band 40 to the swivel eye 16. When clamped to the swivel eye 16, the elastomeric band 40 essentially pivots at ends 68 and 70. As appreciated by those skilled in the art, the elastomeric band 40 can be replaced by two elastomeric bands 40 illustrated in FIG. 3, wherein one end of each of the bands is secured to the swivel eye 16 and opposite ends are secured to the base assembly 17, using the second holding devices 44.

In the embodiment illustrated, the first and second holding devices 42 and 44 are arranged on the swivel eye 16 and the clevis 14 or ball 18, respectively, so as to return the swivel eye 16 to a substantially orthogonal position with respect to the clevis 14 or the ball 18. As appreciated by those skilled in the art, the positions of the first holding device 42 and/or the second holding devices 44 can be chosen so as to obtain other desired return or neutral positions.

Figure 7:
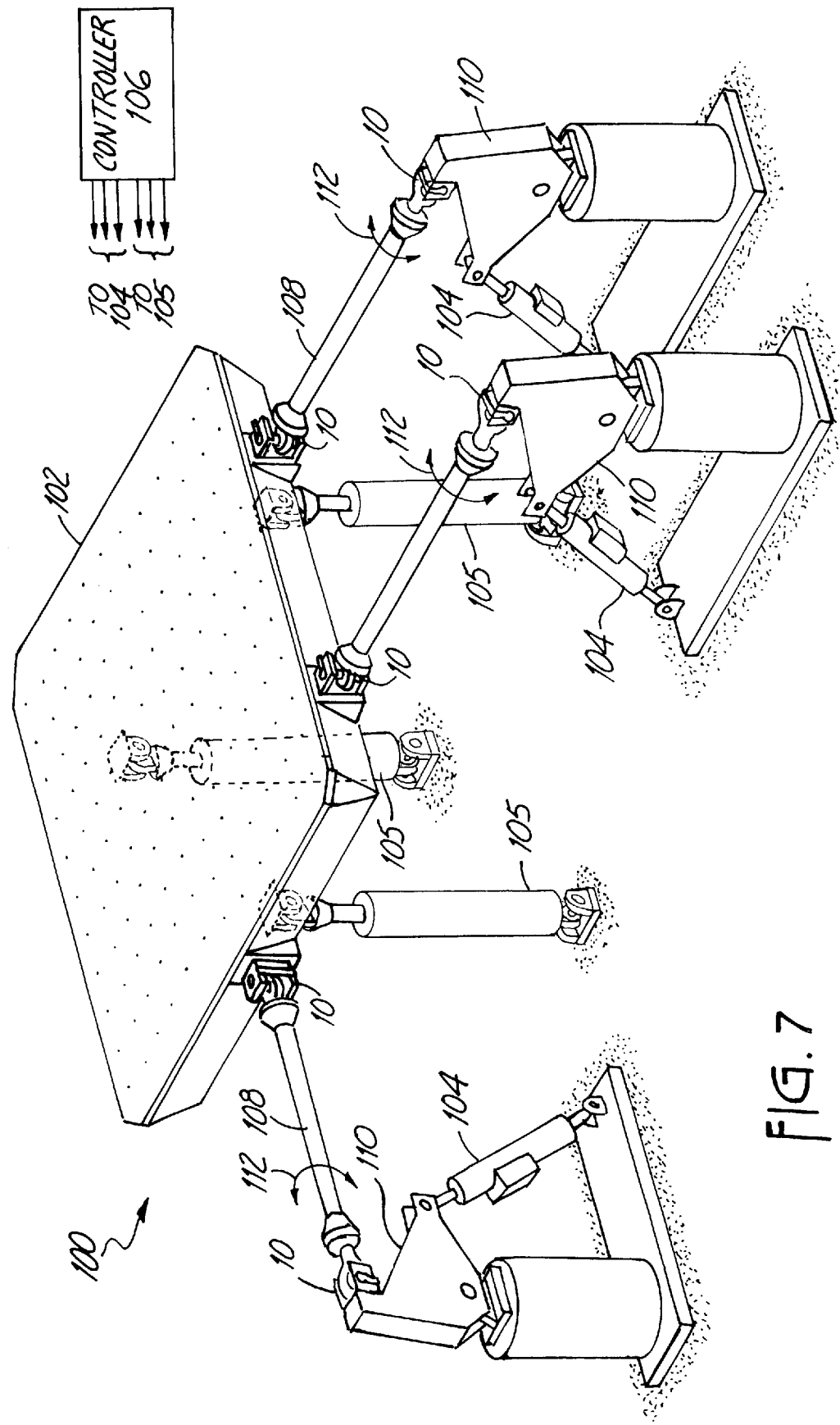
FIG. 7 is a perspective view of a simulation system of the present invention.

The swivel 10 with the elastomeric positioning device 12 is particularly useful on a multi DOF (degree-of-freedom) simulation system, where the swivels are used for transmitting forces, accelerations and amplitudes at all angles to a specimen proportionate to multi-DOF command inputs. FIG. 7 schematically illustrates an exemplary simulation system 100. The system 100 includes a table 102 for supporting the specimen under test and a plurality of actuators 104 and 105 for driving the table 102 in response from a system controller 106. Struts 108 are commonly provided to couple the table 102 to each of the actuators 104. In the embodiment illustrated, swivels 10 are provided between the actuators 104 (or bell cranks 110 as illustrated) and the struts 108, and the struts 108 and the table 102. Although herein illustrated where six swivels 10 are present, it will be appreciated that a swivel 10 can be provided in the system 100 where needed depending upon operating parameters thereof. In this embodiment, the elastomeric positioning devices 12 are particularly helpful for they will dynamically rotate the struts 108 about their longitudinal axes in the direction indicated by double arrow 112 as the table 102 moves to prevent the swivels 10 from assuming an incorrect position due to their off-center, center of mass, as described above.

Although the present invention has been described with reference to preferred embodiments, workers skilled in the art will recognize that changes may be made in form and detail without departing from the spirit and scope of the invention.

What is claimed is:

1. A spherical swivel comprising:
   a base assembly having spaced apart opposed ends and including:
   a clevis; and
   a ball joined to the clevis and supported between the opposed ends;
   a swivel eye movably joined to the ball; and
   an elastomeric positioning device having at least one elastomeric band , wherein the elastomeric positioning device is adapted to restore the swivel eye to a selected position on the ball and is secured to each of the opposed ends of the base assembly and is further secured to the swivel eye.

2. The spherical swivel of claim 1 wherein the elastomeric positioning device includes a clamping plate securing the elastomeric band to the swivel eye.

3. The spherical swivel of claim 1 and wherein an end of the elastomeric band is pivotally joined to the base assembly.

4. The spherical swivel of claim 3 wherein the ball includes shaft portions extending in opposed directions, and wherein separate ends of the elastomeric positioning device are joined to separate shaft portions.

5. The spherical swivel of claim 4 and further comprising a bracket connected to each shaft portion and wherein each end of the elastomeric positioning device is pivotally joined to one of the brackets.

6. The spherical swivel of claim 4 wherein the elastomeric positioning device includes a clamping plate securing the elastomeric band to the swivel eye.

7. The spherical swivel of claim 1 wherein the elastomeric positioning device includes a single elastomeric band having opposed ends connected to the base assembly and a portion between the ends secured to the swivel eye.

8. The spherical swivel of claim 1 wherein the elastomeric positioning device comprises a pair of elastomeric bands, each band having a first end joined to the base assembly and a second end joined to the swivel eye.

9. A multi-degree of freedom simulation system comprising:
   a specimen support;
   a plurality of actuators; and
   at least one swivel operably coupling at least one actuator to the specimen support, the swivel comprising:
   a base assembly having spaced apart opposed ends and including:
   a clevis; and
   a ball joined to the clevis and supported between the opposed ends;

a swivel eye movably joined to the ball; and an elastomeric positioning device having at least one elastomeric band, wherein the elastomeric positioning device is adapted to restore the swivel eye to a selected position on the ball and is secured to each of the opposed ends of the base assembly and is further secured to the swivel eye.

10. The spherical swivel of claim 9 wherein the elastomeric positioning device includes a clamping plate securing the elastomeric band to the swivel eye.

11. The spherical swivel of claim 9 and wherein an end of the elastomeric band is pivotally joined to the base assembly.

12. The spherical swivel of claim 11 wherein the ball includes shaft portions extending in opposed directions, and wherein separate ends of the elastomeric positioning device are joined to separate shaft portions.

13. The spherical swivel of claim 12 and further comprising a bracket connected to each shaft portion and wherein each end of the elastomeric positioning device is pivotally joined to one of the brackets.

14. The spherical swivel of claim 12 wherein the elastomeric positioning device includes a clamping plate securing the elastomeric band to the swivel eye.

15. The spherical swivel of claim 9 wherein the elastomeric positioning device includes a single elastomeric band having opposed ends connected to the base assembly and a portion between the ends secured to the swivel eye.

16. The spherical swivel of claim 9 wherein the elastomeric positioning device comprises a pair of elastomeric bands, each band having a first end joined to the base assembly and a second end joined to the swivel eye.

* * * * *